(12) United States Patent
Akemakou

(10) Patent No.: US 6,271,616 B1
(45) Date of Patent: Aug. 7, 2001

(54) ROTATING ELECTRIC MACHINE WITH PERMANENT MAGNETS AND MAGNETIC RESISTANCE HAVING AN IMPROVED STRUCTURE

(75) Inventor: Dokou Antoine Akemakou, Vitry-sur-Seine (FR)

(73) Assignee: Valeo Equipment Electriques Moteur, Creteil (FR)

( * ) Notice: Subject to any disclaimer, the term of this patent is extended or adjusted under 35 U.S.C. 154(b) by 0 days.

(21) Appl. No.: 09/622,605

(22) PCT Filed: Dec. 17, 1999

(86) PCT No.: PCT/FR99/03181

§ 371 Date: Oct. 11, 2000

§ 102(e) Date: Oct. 11, 2000

(87) PCT Pub. No.: WO00/38301

PCT Pub. Date: Jun. 29, 2000

(30) Foreign Application Priority Data

Dec. 18, 1998 (FR) .................................................. 98 16183

(51) Int. Cl.[7] ..................................................... H02K 1/22
(52) U.S. Cl. ........................... 310/261; 310/152; 310/156; 310/168
(58) Field of Search ..................................... 310/261, 269, 310/152, 156, 168

(56) References Cited

U.S. PATENT DOCUMENTS 4,482,831 * 11/1984 Notaras et al. ....................... 310/156
4,486,678   12/1984 Olson .
5,304,882 *  4/1994 Lipo et al. ........................... 310/156
5,818,140 * 10/1998 Vagati ................................... 310/185
6,072,256 *  6/2000 Shon et al. ........................... 310/156
6,121,706 *  9/2000 Nashiki et al. ....................... 310/168

OTHER PUBLICATIONS

Binns et al: "Use of canned rotors in high–filed permanent magnet machines", IEE Proceedings–B, vol. 139, No. 5, Sep. 1992.

Xu et al: "A New Design Concept of Permanent Magnet Machine for Flux Weakening Operation", IEEE Industry Applications Conference, vol. I, Oct. 3–8, 1993.

International Search Report dated Aug. 18, 2000.

* cited by examiner

Primary Examiner—Nestor Ramirez
Assistant Examiner—Thanh Lam
(74) Attorney, Agent, or Firm—Morgan & Finnegan, LLP

(57) ABSTRACT

The invention concerns a rotating electric machine comprising a stator equipped with armature coils and a rotor mounted rotating inside the stator. The rotor having a rotor part with permanent magnet(s) and a rotor part with magnetic resistance. The rotor is substantially uniform over its axial surface and ahs along its tangential direction a distribution of polar parts with permanent magnet(s) each defining two poles of polarities imposed by magnet(s), ad polar parts with magnetic resistance each defining two poles with free polarities. The invention is applicable to motor vehicle alternators or AC starters.

21 Claims, 2 Drawing Sheets

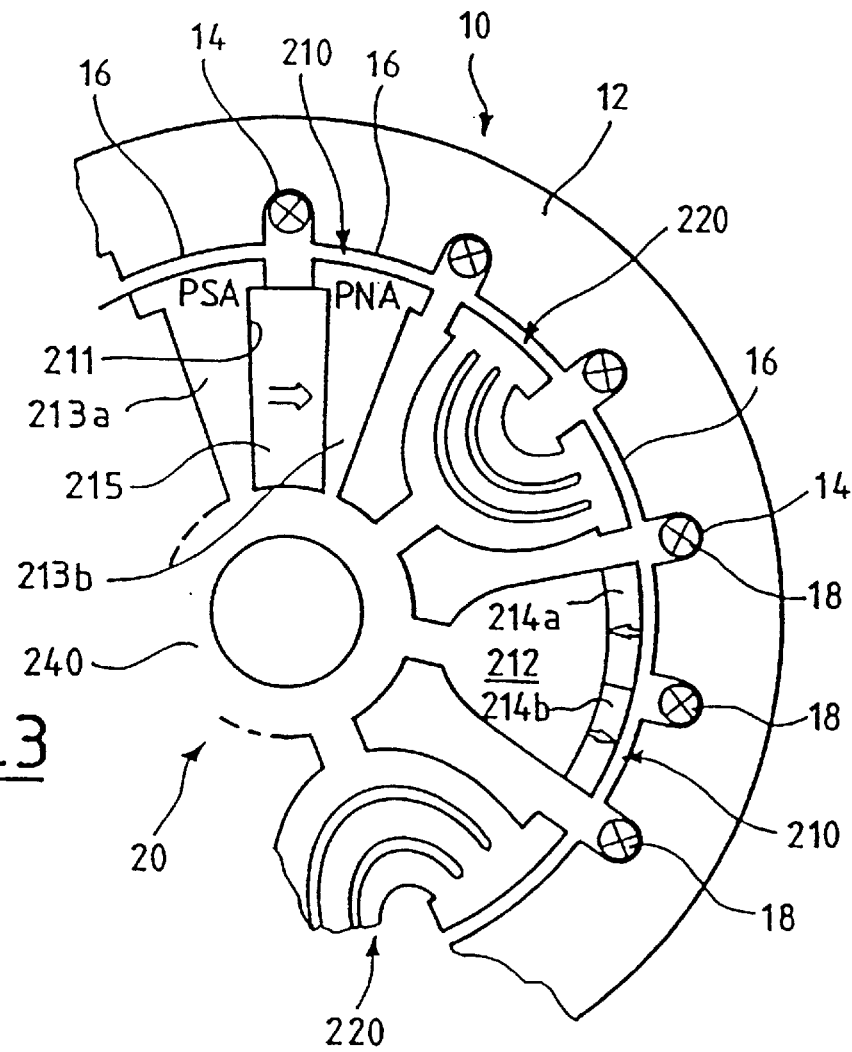
FIG_3
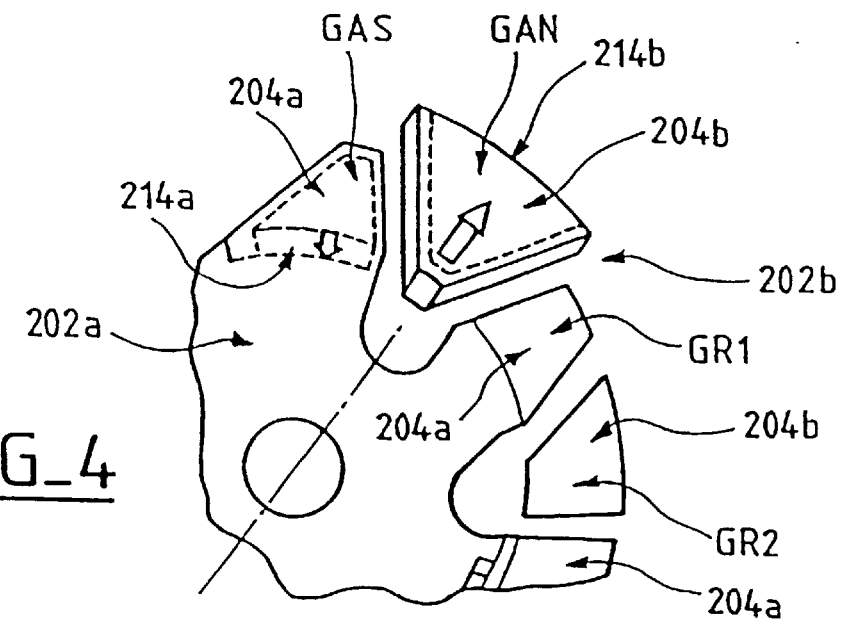
FIG_4

ROTATING ELECTRIC MACHINE WITH PERMANENT MAGNETS AND MAGNETIC RESISTANCE HAVING AN IMPROVED STRUCTURE

BACKGROUND OF THE INVENTION

The present invention relates generally to rotating electrical machines and in particular to a synchronous rotating machine having a permanent magnet rotor.

The document "Comparison of different synchronous motor drives for flux weakening applications", N. Bianchi et al., proceedings of the International Conference on Electrical Machines (ICEM), Istanbul, Turkey, September 1998, volume ⅔, pages 946 et seq, and in particular FIG. 5 of the document and the associated description, discloses a machine whose rotor is separated into two coaxial parts disposed end-to-end in the axial direction.

A first part of the rotor constitutes an excitation magnet rotor and the other part constitutes a variable reluctance rotor.

Although a machine of the above kind has beneficial properties, in particular in terms of flux weakening if the machine has to operate under reduced load conditions, a major drawback is that it is necessary to provide two types of yoke for rotor structure, i.e. a yoke for the permanent magnet part of the rotor and a yoke for the variable reluctance part of the rotor.

A first object of the present invention is to alleviate this drawback and to provide a rotor operating in accordance with the same principle using a single yoke.

To be more precise, the present invention proposes to combine the two rotor parts into a single rotor whose yoke can therefore be made with a single lamination shape.

BRIEF SUMMARY OF THE INVENTION

The present invention therefore proposes a rotary electrical machine, in particular an alternator or combined alternator/starter motor for automobile vehicles, comprising a stator equipped with stator windings and a rotor mounted to rotate inside the stator, the rotor having a permanent magnet rotor part and a variable reluctance rotor part, characterized in that the rotor is substantially uniform throughout its axial length and has in its tangential direction a distribution of permanent magnet pole parts each defining two poles whose polarity is imposed by magnet(s) and variable reluctance pole parts each defining two poles whose polarity is not imposed.

Preferred, but non-limiting, features of the rotating machine according to the present invention are as follows:

- the machine has the same number of permanent magnet pole parts and variable reluctance pole parts, disposed alternately.
- the machine has different numbers of permanent magnet pole parts and variable reluctance pole parts, with at least one succession of at least two pole parts of the same type.
- each permanent magnet pole part comprises two magnets whose flux is essentially radial and which are disposed in the vicinity of the periphery of the rotor.
- the magnets are on the surface.
- the magnets are buried.
- the poles of the rotor are defined by interleaved pole claws of two rotor parts.
- each permanent magnet pole part comprises a magnet whose flux is essentially tangential disposed in a notch formed between two regions of said pole part which define its poles.
- the permanent magnet pole parts and the variable reluctance pole parts are portions of a single yoke.
- each variable reluctance pole part has arrangements for channeling magnetic flux between its two poles.
- each variable reluctance pole part has at least one buried auxiliary magnet for channeling magnetic flux.

BRIEF DESCRIPTION OF THE DRAWINGS

Other features, aims and advantages of the present invention will become more apparent after reading the following detailed description of various embodiments of the invention, which description is given by way of non-limiting example and with reference to the accompanying diagrammatic drawings, in which:

FIG. 3 is a view in cross section of a third embodiment of a rotating machine according to the invention, and FIG. 4 is a perspective view of the rotor of a second embodiment of a rotating machine according to the invention.

DETAILED DESCRIPTION OF THE INVENTION

Figure 1:
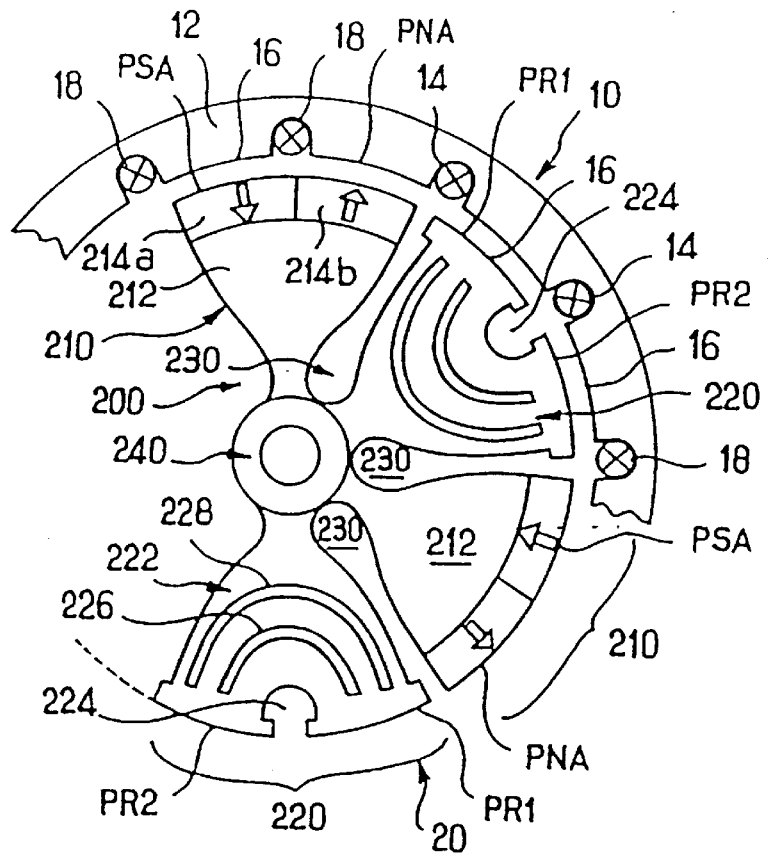
FIG. 1 is a view in cross section of a first embodiment of a rotating machine according to the invention.

FIG. 1 shows a rotating machine which comprises an annular external stator 10 of conventional construction and whose yoke 12 defines a plurality of notches 14 delimited two by two by teeth 16 forming poles. The notches 14 accommodate single-phase stator windings 18. A multiphase stator with distributed windings and with or without shortening of the winding pitch is equally feasible, of course.

The rotor 20 is preferably laminated and comprises permanent magnet sectors alternating in the circumferential direction with variable reluctance sectors. The sectors are preferably made from the same laminations forming a common yoke 200.

In this embodiment, the rotor comprises permanent magnet sectors 210 alternating with variable reluctance sectors 220 and each sector defines two poles of the rotor. To be more precise, each sector 210 shown in FIG. 1 has a yoke part 212 and two magnets 214*a*, 214*b* of opposite polarity mounted on the peripheral surface of the rotor. The two magnets therefore define in the sector concerned a south magnetic pole PSA and a north magnetic pole PNA.

Each sector 220 also has a yoke part 222 which defines a peripheral notch 224 which is left empty in order to define two variable reluctance poles PR1 and PR2. Two curved slots 226 and 228 extend alongside each other to define a preferred trajectory for a magnetic field in either direction between the poles PR1 and PR2.

Thin buried auxiliary magnets (not shown) can also be incorporated into the sectors 220 to channel the flux and in particular to assist and to route the magnetic flux generated by the permanent magnet sectors without degrading flux weakening behavior.

The sectors 210 and 220 are separated two by two by deep voids or notches 230 extending from the periphery of the rotor and joining at the level of a central core 240 of the yoke 200 through which substantially no flux can pass.

The sectors 210 and 220 therefore alternate at the periphery of the rotor to define on that periphery successive pairs of magnet poles PNA and PSA whose polarity is imposed by said magnets and pairs of variable reluctance poles PR1 and PR2 whose polarity is not fixed.

In particular, if the machine is operating under normal operating conditions, the rotor comprises a succession of alternately south and north poles, namely a south pole PSA, a north pole PNA, a pole PR1 which is a south pole because of the propagation of the magnetic flux in the sector 220, a pole PR2 which is a north pole for the same reason, and so on.

In contrast, if the machine is operating under flux weakening conditions, because the current leads the back-EMF (this is a standard phenomenon), the sectors 220 allow the magnetic field to propagate in the opposite direction, which corresponds to a succession of poles comprising a south pole PSA, a north pole PNA, a north pole PR1, a south pole PR2 and so on.

A combined permanent magnet/variable reluctance machine is therefore obtained whose rotor has a homogeneous structure throughout its axial length.

In a variant embodiment, not shown, the magnets 214a, 214b in each sector 210 can be buried a predetermined small distance below the peripheral surface of the rotor.

Figure 2:
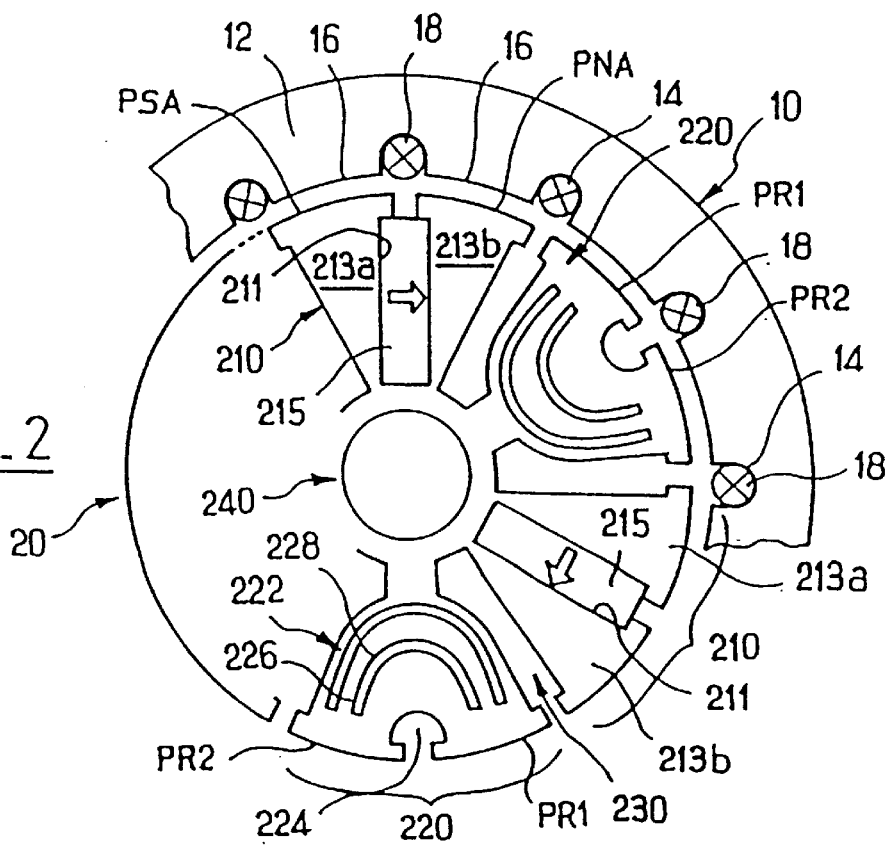
FIG. 2 is a view in cross section of a second embodiment of a rotating machine according to the invention.

FIG. 2 shows a rotating machine similar to that shown in FIG. 1 but in which the permanent magnet sectors are modified so that their south and north poles are produced by a single tangential flux magnet 215.

FIG. 2 shows that each sector 210 has a central notch 211 delimited by two yoke parts 213a and 213b and that a magnet 215 is housed in said notch 211 to define a south pole PSA at the level of the part 213a and a north pole PNA at the level of the part 213b.

Otherwise, this machine is identical to that shown in FIG. 1. Note that this embodiment obtains the benefit of the same operating principle with half the number of magnets.

FIG. 3 combines the embodiment of FIGS. 1 and 2 with an alternation of sectors comprising a magnet sector 210 as shown in FIG. 1, a variable reluctance sector 220, a magnet sector 210 as shown in FIG. 2, a variable reluctance sector 220, and so on.

FIG. 4 shows an embodiment of the invention using a claw-pole rotor.

A claw-pole rotor conventionally comprises a first part 202a with a particular number of generally triangular pole claws 204a and a second part 202b with a particular number of generally triangular pole claws 204b. The pole claws 204a, 204b are interleaved with each other.

Thus in the circumferential direction of the rotor there are two variable reluctance pole claws GR1 and GR2, two permanent magnet pole claws GAS and GAN which have surface-mounted or buried magnets 214a and 214b to impose respective south and north poles on them, and so on.

A rotor of this kind can include an excitation winding or not.

Of course, the present invention is in no way limited to the embodiments described and shown, to which the skilled person can apply any variant or modification conforming to the spirit of the invention.

In particular, depending on the required flux weakening capacity, the relative proportions of the permanent magnet pole sectors and the variable reluctance pole sectors can be modified, for example to provide a sector with permanent magnet south and north poles, a second identical sector with permanent magnet south and north poles, a sector with two variable reluctance poles, then another two sectors each with two permanent magnet poles, and so on.

Compared to the machine described in the article referred to in the introduction, this corresponds to some extent to modifying the distribution between the axial lengths of the permanent magnet rotor part and the variable reluctance rotor part of the prior art machine.

The present invention applies in particular to alternators and combined alternator/starter motors for automobile vehicles.

What is claimed is:

1. A rotary electrical machine, in particular an alternator or combined alternator/starter motor for automobile vehicles, comprising a stator equipped with stator windings and a rotor mounted to rotate inside the stator, the rotor having a permanent magnet rotor part and a variable reluctance rotor part, wherein the rotor is substantially uniform throughout its axial length and has in its tangential direction a distribution of permanent magnet pole parts with a permanent magnet(s) each defining two poles whose polarity is imposed by the magnet(s) and variable reluctance pole parts each defining two poles whose polarity is not imposed.

2. A machine according to claim 1, wherein it has the same number of permanent magnet pole parts and variable reluctance pole parts, disposed alternately.

3. A machine according to claim 2, wherein each permanent magnet pole part comprises two magnets whose flux is essentially radial and which are disposed in the vicinity of the periphery of the rotor.

4. A machine according to claim 2, wherein each permanent magnet pole part comprises a magnet whose flux is essentially tangential disposed in a notch formed between two regions of said pole part which define its poles.

5. A machine according to claim 1, wherein it has different numbers of permanent magnet pole parts and variable reluctance pole parts, with least one succession of at least two pole parts of the same type.

6. A machine according to claim 5, wherein each permanent magnet pole part comprises two magnets whose flux is essentially radial and which are disposed in the vicinity of he periphery of the rotor.

7. A machine according to claim 5, wherein each permanent magnet pole part comprises a magnet whose flux is essentially tangential disposed in a notch formed between two regions of said pole part which define its poles.

8. A machine according to claim 1, wherein each permanent magnet pole part comprises two magnets whose flux is essentially radial and which are disposed in the vicinity of the periphery of the rotor.

9. A machine according to claim 8, wherein the magnets are on the surface.

10. A machine according to claim 9, wherein the poles of the rotor are defined by interleaved pole claws of two rotor parts.

11. A machine according to claim 8, wherein the magnets are buried.

12. A machine according to claim 11, wherein the poles of the rotor are defined by interleaved pole claws of two rotor parts.

13. A machine according to claim 11, wherein the permanent magnet pole parts and the variable reluctance pole parts are portions of a single yoke.

14. A machine according to claim 8, wherein the poles of the rotor are defined by interleaved pole claws of two rotor parts.

15. A machine according to claim 1, wherein each permanent magnet pole part comprises a magnet whose flux is essentially tangential disposed in a notch formed between two regions of said pole part which define its poles.

16. A machine according to claim 15, wherein the permanent magnet pole parts and the variable reluctance pole parts are portions of a single yoke.

17. A machine according to claim 1, wherein the permanent magnet pole parts and the variable reluctance pole parts are portions of a single yoke.

18. A machine according to claim 17, wherein each variable reluctance pole part has arrangements for channeling magnetic flux between its two poles.

19. A machine according to claim 1, wherein each variable reluctance pole part has arrangements for channeling magnetic flux between its two poles.

20. A machine according to claim 19, wherein each variable reluctance pole part has at least one buried auxiliary magnet for channeling magnetic flux.

21. A machine according to claim 1, wherein each variable reluctance pole part has at least one buried auxiliary magnet for channeling magnetic flux.

\* \* \* \* \*